Feb. 13, 1923.
R. E. ABERNATHY
AUTOMATIC HOG CRATE
Filed Mar. 6, 1922
1,444,769
2 sheets-sheet 1
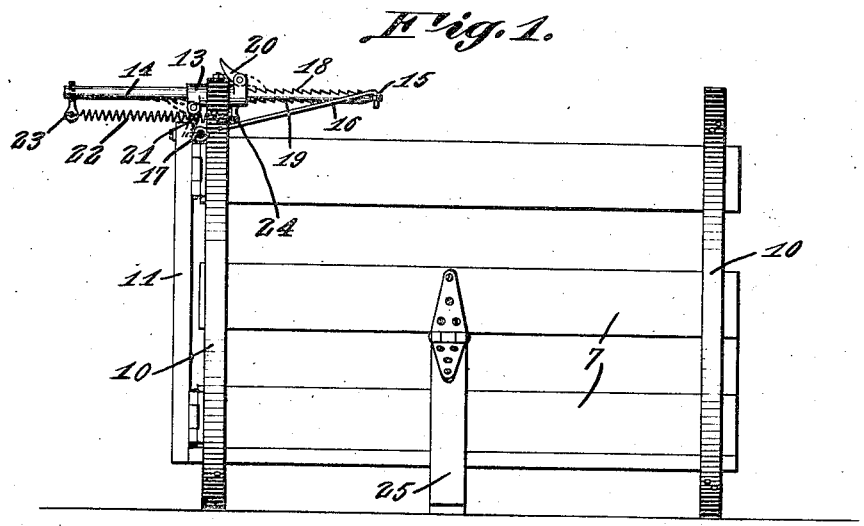
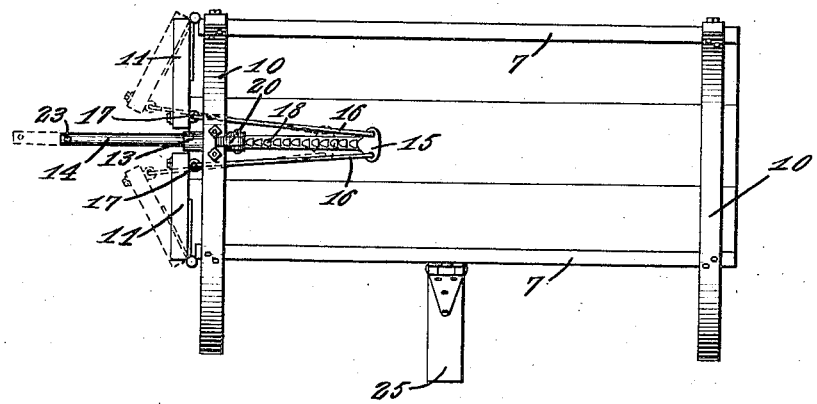
R. E. Abernathy, Inventor Feb. 13, 1923.

R. E. ABERNATHY

AUTOMATIC HOG CRATE

Filed Mar. 6, 1922

R.E.Abernathy, Inventor

By C.A.Snow+Co.
Attorneys

Patented Feb. 13, 1923.

1,444,769

UNITED STATES PATENT OFFICE.

ROBERT EARL ABERNATHY, OF CONCORD, ILLINOIS.

AUTOMATIC HOG CRATE.

Application filed March 6, 1922. Serial No. 541,428.

*To all whom it may concern:*

Be it known that I, ROBERT EARL ABERNATHY, a citizen of the United States, residing at Concord, in the county of Morgan and State of Illinois, have invented a new and useful Automatic Hog Crate, of which the following is a specification.

This invention relates to restraining devices, and more particularly to restraining devices especially designed for catching and holding swine while they are being vaccinated, or otherwise treated.

Another object of the invention is to provide a device of this character which may be operated to prevent the animal from backing from the crate or body portion of the device.

Another object of the invention is the provision of means, whereby the crate or body portion may be tilted laterally, throwing the animal held therein, to his side, permitting the animal to be treated with facility.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a side elevational view of a device constructed in accordance with the present invention.

Figure 2 is a plan view thereof.

Figure 3:
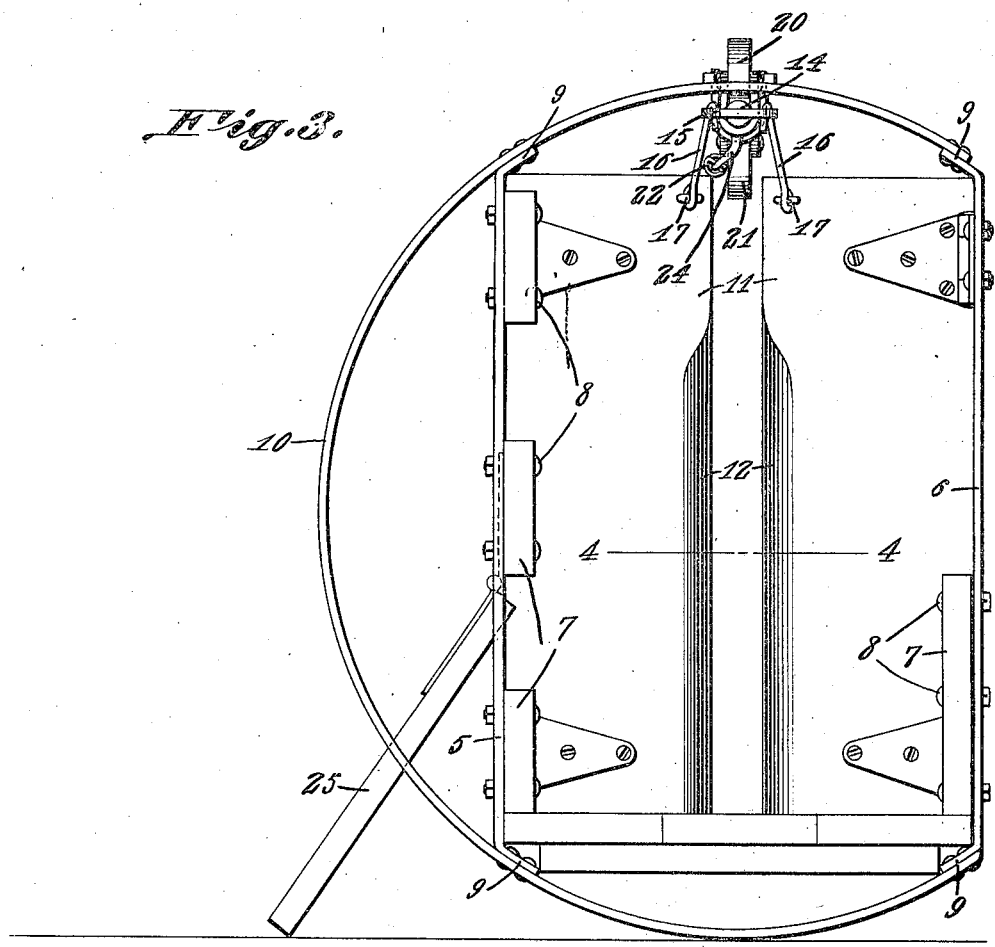
Figure 3 is a rear elevational view disclosing the doors which grip the animal's neck and restrict movement of the animal.
Figure 4:
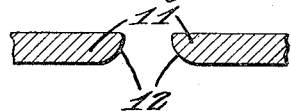

Figure 4 is a sectional view taken on line 4—4 of Figure 3.
Referring to the drawings in detail, the device embodies a frame including vertical bars 5 and 6 disposed adjacent to the ends of the device and to which the side boards 7 are secured, as by means of the bolts 8.
The vertical bars 5 and 6 have their ends 9 disposed at angles with respect to the vertical, and to which, the rockers 10 are secured.

Hinged doors 11 partially close one end of the device, and are provided with curved surfaces 12 adapted to contact with the animal's neck, the curved surfaces being such as to insure against injuring the animal's neck, when the animal is being held. Secured to one of the rockers 10 at a point directly over the doors 11, is a tubular body portion 13, through which operates a rod 14. The inner end of the rod 14 is formed with a head 15 which has openings to accommodate the right angled ends of the rod 16, that in turn have connection with the doors 11, as through the medium of the eye bolts 17.

Formed in the upper and lower surfaces of the rod 15 are ratchets 18 and 19 respectively, the ratchet 18 being formed in the upper surface cooperates with the pawl 20 pivotally supported at one end of the tubular body portion 13, to restrict movement of the rod 14 in one direction. The ratchet 19, which is formed on the under surface of the rod 14 cooperates with the pawl 21, the teeth of the ratchet 19 extending in a direction opposite to the teeth of the ratchet 18, to restrict movement of the rod 14 in the opposite direction and lock the doors in their clamping positions.

Associated with the rod 14 is a coiled spring 22 which has one end thereof secured to the eye bolt 23, that is carried at the outer end of the rod 14, the inner end of the spring 22 being anchored to the body portion 13, through the medium of the eye bolt 24, so that when the doors are moved to their open positions, as shown by dotted lines in figure 2 of the drawings, the spring 22 will be placed under tension.

In order that the device will be normally held in an upright position, a hinged supporting bar 25 is hingedly connected to one side of the device, it being understood that the weight of the rockers 10 is sufficient to normally urge the device to assume a position wherein the doors 11 will be arranged one above the other, and both of the side walls of the device will lie parallel with the ground surface.

The device is so constructed that it can be moved to an inverted position and held in such position by means of the bar 25.

In the use of the device the doors 11 are moved to their open positions, the opening being wide enough to permit the head of the animal to pass therebetween. The pawl 21 is placed in contact with the ratchet 19, the tension of the spring 22 being sufficient to hold the pawl 21 in such position and prevent the doors 11 from closing.

The pawl 20 is now placed in contact with the ratchet 18 to prevent the doors 11 from opening should the animal attempt to pass through the device.

The animal is now driven into the crate and immediately tries to pass through the opened doors, which are open only wide enough for the animal to get its head through. Pressure against doors 11 automatically releases pawl 21 from ratchet 19 allowing doors 11 to close on the animal's neck through action of tension spring 22. Pawl 20 operating in notches of ratchet as doors close prevents doors 11 from opening should animal try to pass through doors 11.

When it is desired to release the animal, the pawl 20 is operated to disengage the ratchet 18, whereby the animal may pass through the doors.

Having thus described the invention, what is claimed as new is:—

1. In a device of the character described, a body portion, rockers secured to the body portion, and arranged to overbalance the body portion, a supporting bar for normally holding the body portion in an upright position, and means at one end of the body portion for clamping an animal.

2. In a device of the character described, a body portion, rockers secured to the body portion, hinged doors at one end of the body portion, a tubular member supported above the doors, a rod movable through the tubular member and carrying an upper and lower ratchet, means cooperating with the upper ratchet for restricting movement of the rod in one direction, means cooperating with the lower ratchet for restricting movement of the rod in the opposite direction, means for connecting the doors to the rod whereby movement of the doors results in a relative movement of the rod, and resilient means for limiting movement of the rod.

3. In a device of the character described, a body portion, means secured to the body portion to permit the same to be rocked laterally, a pair of hinged doors, a tubular member supported above the doors, a rod operating through the tubular member, said rod having teeth on its upper edge and having teeth extended in the opposite direction disposed on its opposed edge, pawls cooperating with the teeth of the rod to restrict movement of the rod, rods connecting the doors and first mentioned rod, whereby movement of the first mentioned rod will result in a relative movement of the swinging doors, and resilient means for urging the doors in one direction.

In testimony that I claim the foregoing as my own, I have hereto affixed my signature in the presence of two witnesses.

ROBERT EARL ABERNATHY.

Witnesses:
 WALTER MCCARTY,
 C. E. NEWTON.